June 17, 1969  N. SEBESTYEN  3,450,478
DEVICE FOR THE SIMULTANEOUS MEASUREMENT OF OPTICAL
ROTATION AND CIRCULAR DICHROISM
Filed June 21, 1966
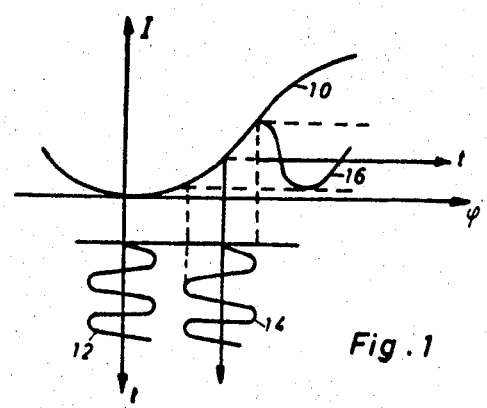
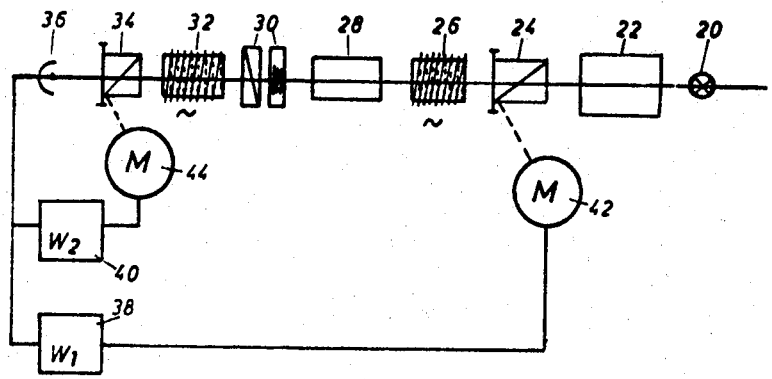
NIKOLAUS SEBESTYEN
*INVENTOR.*

NIKOLAUS SEBESTYEN
*INVENTOR.*

United States Patent Office 3,450,478
Patented June 17, 1969

3,450,478
DEVICE FOR THE SIMULTANEOUS MEASUREMENT OF OPTICAL ROTATION AND CIRCULAR DICHROISM
Nikolaus Sebestyen, Uberlingen (Bodensee), Germany, assignor to Bodenseewerk Perkin-Elmer & Co. GmbH, Uberlingen (Bodensee), Germany
Filed June 21, 1966, Ser. No. 559,199
Int. Cl. G01n 21/44
U.S. Cl. 356—117       3 Claims

ABSTRACT OF THE DISCLOSURE

An automtaic polarimeter not only measures the optical rotation of a sample in a more or less conventional manner, but also measures the circular dichroism thereof by utilizing a double-refracting (quarter-wave) retardation plate. In a preferred embodiment, the apparatus includes a first plane polarizing prism and means for oscillating the plane of the resulting polarized light (for example a Faraday modulator) at a first frequency ($\omega_1$) before the light has passed through the sample; behind the sample is positioned a quarter-wave plate of double refracting material, a second polarization plane oscillator at a different frequency ($\omega_2$), a plane polarizing analyzer, and a radiation detector. The detector will generate a first frequency ($\omega_1$) signal component when the optical rotation of the sample causes the plane of polarization (at the center of oscillation) from the polarizer to be no longer parallel to the optic axis of the quarter-wave plate; this signal is used to rotate the polarizer until the plane of the polarized light (or the plane of the major axis of elliptically polarized light) is again made parallel to the optic axis of the quarter-wave plate. A detector signal component at the second frequency ($\omega_2$) will be generated which is proportional to the amount of deviation from perpendicularity of the finally emerging plane of polarization of the light from the quarter-wave plate relative to the polarization plane of the analyzer; this $\omega_2$ signal is utilized to rotate the analyzer to the balanced perpendicular position. When both of these two different frequency signal components have been nulled, the major axis of the elliptically polarized light reaching the quarter-wave plate will be parallel to its optic axis (by adjustment of the polarizer, compensating the optical rotation of the sample); and (since the quarter-wave plate will convert elliptically polarized light having its major axis parallel to the optic axis of the plate into plane polarized light, at an angle relative to this optic axis by an amount depending on the original ellipticity), the position of the analyzer at balance will indicate the amount of circular dichroism of the sample.

The present invention relates to a device for the simultaneous measurement of optical rotation and circular dichroism of a sample.

It is known that every plane polarized wave may be considered to be the result of a left and a right circularly polarized wave. In an optically active medium the one circularly polarized wave passes more rapidly through the medium than the other one, as the indices of refraction $N_l$ and $N_r$ are different for left and right circularly polarized waves. Thereby, the two waves experience a path difference with respect to each other which will become effective as a rotation of the polarization plane. Thus, the optical rotation is nothing else but the phenomenon of a circular double refraction, it being presupposed that the extinction coefficients of the sample for right and left circularly polarized waves are equal. Under this presupposition, a plane polarized incoming wave also leaves the medium as plane polarized wave. The rotation depends on the wavelength of the used light. This rotation may be measured as a function of the wavelength and may be recorded and then the optical dispersion of rotation of the respective medium will be obtained.

In certain wavelength ranges the extinction coefficients $\epsilon_L$ and $\epsilon_R$ for left and right circularly polarized light, respectively become different, that is that, for instance, the right circularly polarized light will be attenuated more strongly than the left circularly polarized light (Cotton effect). Consequently, upon exit from the medium the light will not be plane polarized again, but elliptically polarized instead. This phenomenon is called circular dichroism. The ellipticity of the outcoming beam is connected with the difference in the extinction coefficients $\Delta\epsilon = \epsilon_L - \epsilon_R$ according to the expression $$\gamma = \Delta\epsilon \cdot \frac{2.303}{4} \cdot l \cdot c$$

wherein $l$ the layer thickness and $c$ the concentration of the optically active substance.

When investigating structures of molecules, both the dispersion of rotation and the circular dichroism are of importance. It is the object of the present invention to provide an apparatus which permits measuring simultaneously the optical rotation and circular dichroism and which renders possible a particularly sensitive measurement of the circular dichroism.

For measuring the optical rotation, the sample is commonly arranged between a polarizer and an analyzer. If the sample is optically inactive, the intensity of the light passing therethrough will become zero, if polarizer and analyzer are in crossed relationship with each other. If the sample rotates the polarization plane of the light through an angle $\alpha$, the analyzer must be caused to follow by rotation from the aforementioned crossed position through the angle $\alpha$, until the intensity will be zero again. It is known to automatically effect this balance. For this purpose the polarization plane either of the light or of the analyzer will be periodically changed with a certain frequency of, say $\omega_1$ about a central position. Behind the analyzer there is arranged a photoelectric detector, and this detector will receive light intensity variations upon the periodic variation of the polarization plane. If the oscillation of the polarization plane takes place about the null position wherein analyzer and electric vector are in crossed relationship with each other, the signal of the detector will have a frequency $2\omega_1$. However, if in the central position the electric vector of the light is not exactly in crossed relationship with the analyzer, the detector signal also contains a component with the single frequency $\omega_1$. This is easy to understand by reference to FIG. 1. Therein, the light flux passing through the analyzer is represented as a function of the deviation $\psi$ from the crossed position between the electric vector of the light and the polarization plane of the analyzer (curve 10). This light flux is proportional to $\cos 2\psi$. If therebelow the symmetrical periodical changes of the angle are observed (curve 12), it can be seen that with the positive "half-waves" of $\psi$ there results the same course as with the negative ones. Thus, the change in the light flux has a fundamental frequency of $2\omega_1$. If, however, on the average the analyzer or the electric vector of the light is rotated out of the crossed position, as is illustrated by curve 14, a curve 16 will be obtained wherein the positive half-wave effects a further increase of the light flux, the "negative half-wave," however, a reduction. As can be seen from curve 16, a signal is obtained containing a component with the frequency $\omega_1$. This component is the more marked, the further analyzer and electric vector of the polarized light deviate in the central position from the crossed position thereof. The signal has the one or the other of two phase positions shifted by 180° with respect to each other, depending on whether the deviation takes place to the one side or to the other side. The oscillations of the polarization plane of the light may be caused by a mechanical rotary oscillation of the polarizer or also by a Faraday modulator. Instead, also the analyzer may possibly oscillate. The obtained signal with the frequency $\omega_1$ may be utilized, for instance, to automatically rotate the analyzer to follow, until the $\omega_1$ component disappears.

The present invention starts from such an arrangement, including a polarizer and means for changing the polarization plane of the light about a central position with a first frequency, a radiation detector arranged in the path of rays behind the sample and with first balancing means for changing said central position of the polarization plane, which balancing means are controllable by the component of the detector signal with said first frequency, and is characterized by the following additional features:

(a) In the path of rays there is arranged a double refracting optical element.

(b) The polarization plane of the analyzer is periodically variable about a central position with a second frequency ($\omega_2$).

(c) second balancing means are provided for changing said central position of the polarization plane of the analyzer, which means are controllable by the component of the detector signal with said second frequency.

By means of the first balancing means the polarization plane of the light or, with elliptically polarized light, the major principal axis of the ellipse is always maintained such as to coincide with the optic axis of the double refracting element. Suppose that the sample has no circular dichroism. As original position, suppose a position wherein the analyzer is furthermore crossed with respect to the optic axis of the double refracting optical element. In this case the radiation detector will receive no light apart from the modulation with double the first frequency (i.e., at $2\omega_1$). The double refracting optical element has no influence on the behavior of polarization of the light, if the polarization plane thereof coincides with the optic axis of the double refracting optical element. Thus, only plane polarized light will strike the analyzer, the polarization plane of which is crossed with respect to that of the analyzer. Now, if the polarization plane of the light is periodically moved towards the one or the other side relative to the stationary double-refracting optical element, then by double refraction thereof the plane polarized light will become right elliptically polarized light at one time, and left elliptically polarized light at another. The ellipticities are absolutely equal and the major or principal axis of the ellipses coincides with the optical axis of the double refracting optical element. The ellipticity becomes the greater, as the angle between polarization plane and optic axis of the double refracting optical element becomes greater. In spite of crossed mutual position of analyzer and polarization plane light will therefore strike the radiation detector, as the minor axis of the ellipse falls in the direction of the polarization plane of the analyzer. Upon an oscillating movement of the analyzer there will be caused light intensity variations and a corresponding detector signal, and this signal will be at the fundamental frequency $2\omega_2$ and $2\omega_1$ and higher harmonics, if $\omega_2$ is the oscillating frequency of the polarization plane of the analyzer. Similar conditions arise as have already been explained in conjunction with the curves 10 and 12 in FIG. 1. In this state, there will be no signal with the single frequency $\omega_2$ and $\omega_1$.

Now, if in a sample there will be circular dichroism, elliptically polarized light initially will strike the double refracting optical element. Even in the central position of the analyzer wherein the polarization plane of the analyzer is in crossed relationship with the optical axis of the double refracting optical element, light passes through the analyzer onto the radiation detector, corresponding to the minor axis of the ellipse. The light which issues from the double refracting optical element, is plane polarized and inclined to the optical axis of the double refracting optical element. With an oscillating movement of the analyzer with the frequency $\omega_2$ there will not only occur in the detector signal a component with the frequency $2\omega_2$, but also an additional component with the fundamental frequency $\omega_2$. Similar conditions prevail, as have already been explained in conjunction with the curves 10, 14, and 16 in FIG. 1.

By a rotation of the central position of the polarization plane of the analyzer it may be achieved that in this central position the ellipticity of the light caused by the sample is just compensated with opposite sense of rotation by ellipticity which is caused by the double refracting optical element. In this position, there is only one component of the frequency $2\omega_2$ in the output signal. The component with the single frequency $\omega_2$ from this central position of the analyzer increases towards both sides and upon passage through this "position of balance" reverses its phase. Thus, the $\omega_2$ signal may be utilized to automatically rotate the analyzer into the "position of balance." Then, the position of the analyzer is representative of the circular dichroism of the sample. Thus, according to the invention the measurement of the circular dichroism may be reduced to a measurement of angle with the aid of a double refracting optical element. This will result in a convenient and very accurate measuring method. The position of the polarizer in a state of balance, gives at the same time an indication of the optical rotation of the sample so that both measuring quantities, that is optical rotation and circular dichroism are automatically obtained at the same time. A monochromator may be connected in front of the polarizer and the dependence of both measured quantities (i.e., optical rotation and circular dichroism) on the wavelength may be determined.

The double refracting optical element may be a quarter-wave plate. This is a plate consisting of double refracting material producing an optical path difference of $\lambda/4$ between the ordinary and the extraordinary ray. If the polarization plane of the incident plane polarized light is under an angle of 45° with respect to the optical axis of the quarter-wave plate the outcoming light will be circularly polarized. When using a quarter-wave plate ellipticities up to an axis ratio of one may be compensated. This case would occur if in the sample the left or right circularly polarized ray was completely absorbed so that only the other circularly polarized ray would remain.

The periodic rotation of the polarization plane of the light or of the analyzer may be effected in various manners. The polarizer or the analyzer may be mechanically caused to oscillate. The actual polarizer and analyzer may also be let alone (i.e., remain stationary) and one Faraday modulator each may be additionally inserted in the path of rays whereby a periodic rotation of the polarization plane will be achieved. The variations of the center postions of the polarization planes may also be accomplished in various ways. The polarizer or the analyzer, for instance in the form of polarization prisms may be rotated by a servomotor. To change the direction of polarization, the thickness of an optically active layer may be changed, for instance in that two wedges of an optically active material, that is one rotating the polarization plane, are mating along the inclined surfaces thereof and are moved against each other. To be able to produce a rotation of the polarization plane as well towards the one side as also towards the other side, in addition to the two wedges a plate of constant thickness will be provided which rotates the polarization plane in opposite direction, then the polarization plane will be rotated in the one or in the other direction depending on whether the layer thickness of the two wedges is greater or smaller than that of the plate. However, a rotation of the polarization plane may also be effected utilizing the Faraday effect. The path of rays penetrates a suitable substance which is surrounded by a coil. The coil produces a magnetic field in parallel to the optitcal axis of the path of rays. This magnetic field effects a rotation of the polarization plane and the latter is proportional to the magnetic field and therewith to the coil current. The polarization plane may be varied by changing the coil current and the coil current may be utilized as a measuring value for the rotation of the polarization plane.

An embodiment of the present invention is schematically presented in FIGS. 2 to 5 and described as follows:

FIG. 2 schematically illustrates the apparatus design.

Figure 3:
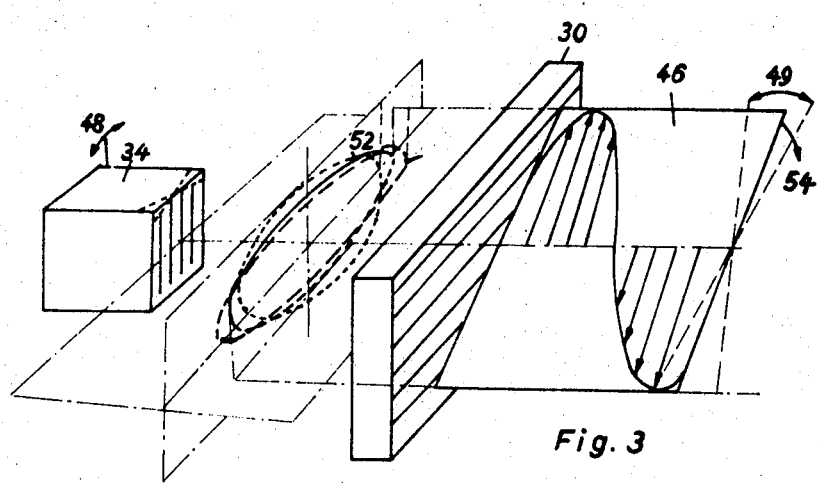
FIGURE 3 is a diagrammatic representation of the various polarization relationships when only optical rotation is present.

Reference numeral 20 designates a light source. A beam of rays from the light source 20 is rendered monochromatic by a monochromator 22. It penetrates a polarizer in the form of a customary polarization prism 24 and a first Faraday modulator 26. The beam of light then passes through the sample 28, a double refracting optical element, for instance through an electro-optical crystal or through a Soleil-Babinet compensator 30 and a further Faraday modulator 32. After passage through an analyzer 34 also in the form of a polarization prism, the beam of light then strikes a radiation detector 36. The Faraday modulator 26 is excited with a frequency $\omega_1$, and the Faraday modulator 32 with a frequency $\omega_2$. The radiation detector generally receives a signal with components of the frequency $\omega_1$, $2\omega_1$ plus higher harmonics as well as with components $\omega_2$, $2\omega_2$ plus higher harmonics. Filters 38 and 40 filter out from this signal the components with the frequency $\omega_1$ and $\omega_2$, respectively, and these control servomotors 42 and 44, respectively, rotate the polarization prisms 24 and 34, respectively, to make them follow.

Motor 42 is effective to always rotate the polarizer 24 such that the polarization plane of the light or the major axis of the ellipse, respectively, of the elliptically polarized light is always parallel with the optic axis of the double refracting optical element. Motor 44 is effective to rotate the analyzer relative to the optic axis of the double refracting optical element 30 such that the double refraction in this element compensates the ellipticity caused by the circular dichroism of the sample. In a state of balance the $\omega_1$ and $\omega_2$ components of the detector signal will both have disappeared.

Figure 4:
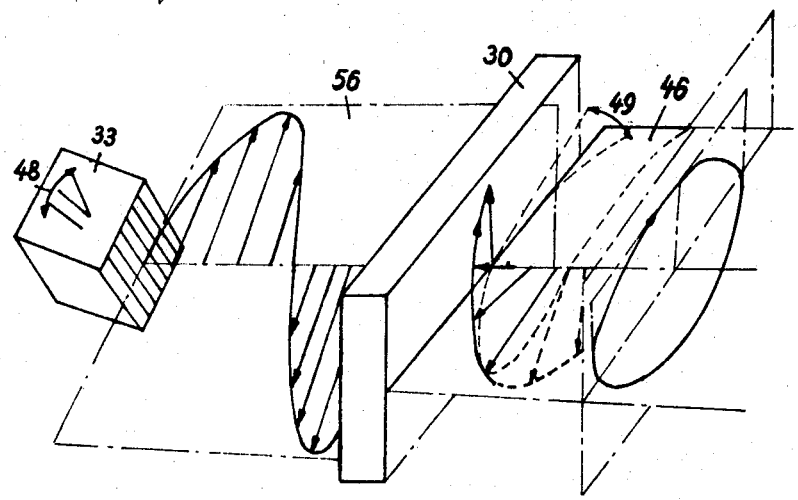
FIGURE 4 is a similar diagrammatic representation of the situation when the sample exhibits circular dichroism, but in which there is no (unbalanced) optical rotation.
Figure 5:
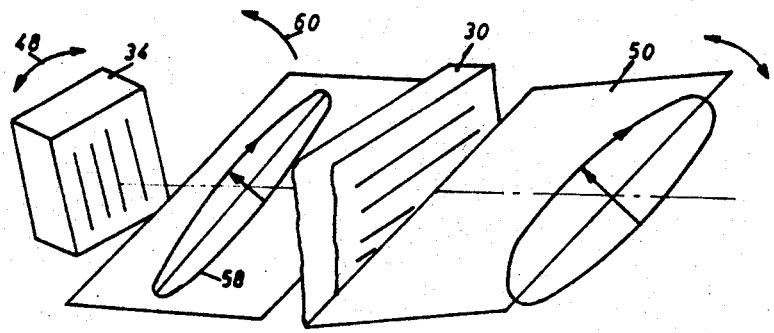
FIGURE 5 is a similar diagrammatic representation of the polarization forms when the sample exhibits circular dichroism and there is also present unbalanced optical rotation.

FIGS. 3 to 5 illustrate the mode of operation of the double refracting optical element 30 which is shown here as simple plate the optic axis of which is horizontal (indicated by the hatching). A plane polarized wave will strike plate 30, the polarization plane 46 of which is inclined to the optical axis of plate 30. The analyzer 34 with the polarization plane thereof (indicated by the hatching) is perpendicular to the optical axis of the double refracting optical element. Due to the double refraction elliptically polarized light issues from plate 30, having a component (the minor axis of the ellipse) in the direction of the polarization plane of the analyzer 34. The analyzer 34 in the shown central position thereof will already transmit light to detector 36. If the polarization plane 46 is caused to oscillate as shown by the double arrow 49 with the frequency $\omega_1$, the ellipticity of the light striking the detector will be increased in the one direction, in the other direction it will be reduced, as is indicated by the broken line ellipses; and accordingly the component of the electric vector lying in the direction of the polarization plane of the analyzer, which corresponds to the minor axis of the ellipse will be changed. Conditions prevail which are analogous to that of the curves 14 and 16 in FIG. 1. A signal component of frequency $\omega_1$ is produced whereby the polarizer via motor 42 is rotated in the direction of arrow 54 until plane 46 coincides with the optical axis of plate 30, that is, is horizontal. Then, plane polarized light will issue at plate 30. The analyzer 34 in the central position thereof will then have its polarization plane perpendicular to the optic axis of the $\lambda/4$ plate. The effective oscillating movement of analyzer 34 at a different frequency, $\omega_2$, is illustrated in the concrete embodiment of FIG. 2, by the Faraday modulator 32. The effect will not be changed thereby.

FIG. 4 illustrates an arrangement in a state of balance for measuring the circular dichroism of the sample. Left elliptically polarized light caused by the sample will strike the double refracting plate 30, the principal axis of the ellipse coinciding with the optic axis of plate 30. In this case plane polarized light will issue from plate 30. The plane 56 of this plane polarized light depends on the ellipticity of the light striking plate 30. The greater the ellipticity of the incident light, the greater is the angle between the plane 56 and the optic axis of plate 30.

Now, if the analyzer 33 oscillates with the frequency $\omega_2$ as indicated by the double arrow 48, at the detector there will be produced a signal also with the single frequency $\omega_2$ in the manner described with reference to FIG. 1. This signal is effective to rotate the analyzer 33 from its position perpendicular to the optical axis of plate 30 until the polarization plane thereof will be perpendicular to plane 56 (as shown). For such "balanced" position of analyzer 33 the detector only supplies a signal with the fundamental frequency $2\omega_2$.

In contrast thereto, FIG. 5 illustrates a state of unbalance with the same circular dichroism of the sample as in FIG. 4. In the illustrated position of plane 50, the circular dichroism is not yet compensated by the double refraction of plate 30. Left elliptically polarized light is still existing, as is illustrated by the curve 58, which still has a component in the direction of the polarization plane of analyzer 34 even through the polarizer is "crossed" with respect to the major axis of the ellipse 58. In the manner illustrated with reference to FIG. 3 a signal component of the frequency $\omega_2$ and $\omega_1$ will be produced which via motors 44 and 42 rotates the analyzer 34 and the polarizer 24 in the sense of arrows 60 and 54 into the position illustrated in FIG. 4.

In the described embodiment, thus, in the state of balance the position of the polarizer 24 is representative of the optical rotation in the sample and the position of the analyzer is representative of the circular dichroism. The polarizer is rotated to follow until the (central position of oscillation of the) plane of the plane polarized light, or in the case of elliptically polarized light the principal axis of the ellipse striking the double refracting element coincides with the optic axis of the double refracting element 30, so that plane polarized light will issue therefrom. The plane of this light depends on the ellipticity of the incident light, and therefore on the amount of the circular dichroism of the sample. The analyzer 34 is adjusted so as to be perpendicular to the latter plane. Of course, the analyzer 34 could also be adjusted such as to be parallel to the polarization plane of the light. Then too, the $\omega_2$ share will disappear. However, an undesired constant light component will then strike the detector 36.

Figure 6:
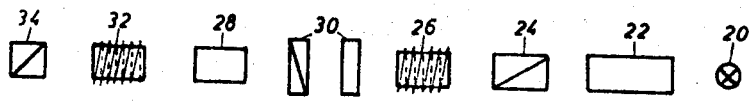
FIG. 6 illustrates a modified embodied form of the invention.

The arrangement may also be provided such as is illustrated in FIG. 6. Therein, the double refracting optical element 30 is arranged in front of the sample 28. The action is the same as in FIG. 2. However, the rotation of the polarizer 24 out of the plane perpendicular to the optic axis of the λ/4 plate 30 then will be representative of the circular dichroism and the rotation of the analyzer 34 will be representative of the optical rotation.

To achieve that the double refracting optical element 30 acts as "λ/4 plate" for all wavelengths, it may be designed as electro-optical crystal through which light is transmitted in the direction of the optical axis and wherein an electric field is applied in the direction of the optic axis. By means of this field the previously uniaxial crystal will be made effectively biaxial. For the ray passing through in the direction of the original axis there will result a double refraction. If $\eta_1$ is the index of refraction of the ordinary ray and $\eta_2$ the index of refraction of the extraordinary ray, then $$\eta_1 - \eta_2 = \eta_2{}^3 rE = \eta_2{}^3 r \cdot \frac{U}{d}$$

wherein $r$ the electro-optical constant, $U$ the voltage applied and $d$ the thickness of the crystal. Then E will be the electric field intensity. With a voltage $$U = \lambda/4\eta^3 r$$

the phase shift between ordinary and extraordinary rays will be equal to λ/4. Then U may be changed as a function of λ so as to achieve the effect of a λ/4 plate for all wavelengths.

I claim:

1. A device for measuring circular dichroism of a sample comprising in optical alignment:
   means for producing a beam of light passing through a sample station;
   first and second plane polarizing means in said light beam on opposite sides of said sample station;
   a double-refracting optical element in said light beam between said sample station and said second polarizing means with its optic axis perpendicular to the light beam direction and parallel to the average plane of polarization of said first plane polarizing means when no sample is present at said sample station;
   a light detector receiving said light beam after its passage through both of said plane polarizing means, said sample station at which the sample to be tested will be present, and said double-refracting element;
   balancing means for causing at least the average position of the effective plane of polarization of said first polarizing means to become parallel to the optic axis of said double-refracting element when a sample is present at said sample station, thereby balancing any optical rotation caused by said sample;
   means for periodically varying the effective polarization plane of said second polarizing means about a central position at a particular known frequency;
   and nulling means connecting to the output of said light detector and responsive to its signal component at said particular known frequency for adjusting said central position of said effective polarization plane of said second polarizing means so as to null said particular frequency component;
   whereby when said optical rotation balancing means has caused the effective average plane of polarization of said first polarizing means to become parallel to the optic axis of said double-refracting element, said nulling means will position said second polarizer relative to the optic axis of said double refracting element so as to balance any ellipticity of the polarized light caused by circular dichroism of the tested sample, at which position said particular frequency component will be nulled.

2. A device according to claim 1, in which:
   said double-refracting optical element is a quarterwave plate.

3. A device according to claim 1, in which:
   said double-refracting optical element is an electro-optical crystal through which light is transmitted in the direction of its optic axis, and to which a variable electric field, proportional to the wavelength of the light utilized, is applied in the direction of said optic axis.

References Cited

UNITED STATES PATENTS

| | | | |
|---|---|---|---|
| 2,933,972 | 4/1960 | Wenking | 88—14 |
| 2,976,764 | 3/1961 | Hyde et al. | 250—225 |
| 3,041,921 | 8/1962 | Pickels et al. | 250—225 |
| 3,183,763 | 5/1965 | Koester | 88—14 |
| 3,272,988 | 9/1966 | Bloom et al. | 250—225 |
| 3,312,141 | 4/1967 | Cary | 88—14 |

JAMES W. LAWRENCE, *Primary Examiner.*

DAVID O'REILLY, *Assistant Examiner.*

U.S. Cl. X.R.

250—218, 225